G. A. McCORMACK.
STUD AND SOCKET FASTENER.
APPLICATION FILED JAN. 6, 1917.

1,234,359.

Patented July 24, 1917

Inventor
Geo. A. McCormack
By Wm. B. H. Downs
Attorney

UNITED STATES PATENT OFFICE.

GEORGE A. McCORMACK, OF SOUTH BOSTON, MASSACHUSETTS, ASSIGNOR TO UNITED STATES FASTENER COMPANY, A CORPORATION OF MAINE.

STUD-AND-SOCKET FASTENER.

1,234,359.  Specification of Letters Patent.  Patented July 24, 1917.

Application filed January 6, 1917. Serial No. 140,951.

*To all whom it may concern:*

Be it known that I, GEORGE A. McCORMACK, a citizen of the United States, residing at 422 Sixth street, South Boston, in the county of Suffolk and State of Massachusetts, have invented an Improvement in Stud-and-Socket Fasteners, of which the following description, in connection with the accompanying drawings, is a specification, like letters on the drawings representing like parts.

This invention relates to a stud and socket fastener, and has for its object to produce an improved fastener in which the members are positively engaged to resist the strains incident to their holding or fastening function, but may be disengaged and separated by a strain or pull exerted in the proper direction.

Figure 1:
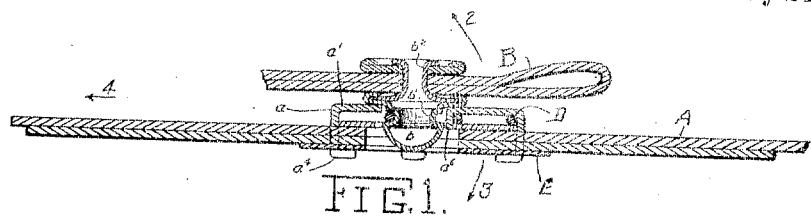
Figure 2:
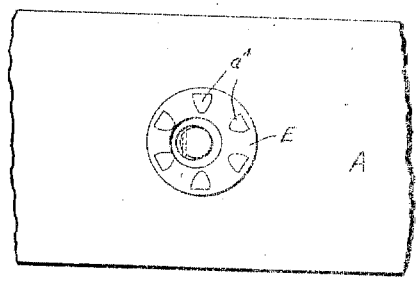
Figure 3:
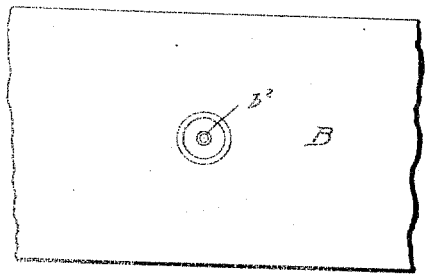
Figure 4:
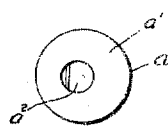
Figure 5:
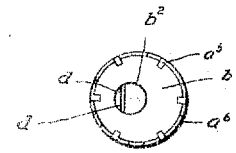
Figure 6:

In the accompanying drawings, Figure 1 is a longitudinal section showing the fastening members applied to the fabric or material to be fastened and engaged with one another; Fig. 2 is a plan view of the underneath or rear side of the socket member attached to a piece of material; Fig. 3 is a plan view of the under or rear side of the stud member applied to a piece of material; Figs. 4 and 5 are front and rear views of the socket member detached from the material; Fig. 6 is a side elevation thereof; and Fig. 7 a plan view showing the interior of the socket member as seen when the bottom plate is removed.

The fastener is of that kind in which the socket member contains a spring latch or holding device which automatically engages with the stud member when forcibly pressed into the socket.

The fastener is suitable for fastening the curtains of a vehicle or for similar purposes and in Figs. 1, 2, and 3, the socket member is shown attached to one flap A of a curtain or piece of fabric to be fastened and the stud member is attached to the other flap B, but either member might be attached to the vehicle body if it were desired to fasten the curtain directly thereto.

The socket member is essentially an apertured spring chamber shown as composed of two pieces of which the main or body piece $a$ comprises the top or outer plate $a'$ having the aperture $a^2$ to receive the stud and having around its outer margin a flange or side wall $a^3$ shown as provided with prongs or projections $a^4$, $a^5$ best shown in Figs. 5 and 6.

The bottom or inner plate $b$ is similar to the outer plate, but without a side flange, and is of proper size to fit within the flange $a^3$ of the main piece in which it is secured by turning down the prongs $a^5$ as best shown in Figs. 5 and 6, there being sufficient space left between the top and bottom plates to serve as a spring chamber for the spring catch or holding device $d$.

The bottom plate $b$ has an aperture $b^2$ corresponding to that in the top plate and the said apertures are preferably eccentric as shown, in order to facilitate the application of the socket member of the fastener to the material in the proper position for the desired operation.

The spring latch or fastening device is shown as composed of a single piece of wire formed to perform the desired functions and comprising a straight latch portion $d'$ which extends across the aperture in the spring chamber at one side of the center thereof, said straight portion thus lying between the center and periphery of the aperture and being at one end of a curved portion $d^2$ which is shown as curved to conform substantially to the inner surface of the side wall $a^3$ of the spring chamber and is connected by a reversely curved portion $d^3$ with an abutment engaging portion $d^4$ which is engaged with a support or abutment $a^6$.

Figure 7:
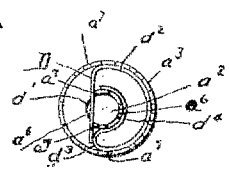

Said abutment or support for the spring is shown as afforded by a projection $a^6$ from one of the spring chamber plates extending part way around the aperture for the entrance of the stud, and the ends of this projecting portion at $a^7$ also form the support for the latch portion $d'$ as best shown in Fig. 7, and serve as a stop to limit the movement of the latch portion inward or toward the center of the aperture.

The spring is set with a tendency to force the portions $d$, $d^4$ toward one another and thus to press the portion $d'$ inward toward the center of the aperture, its inward movement being arrested or limited by the stops $a^7$, while said latch portion $d'$ is free to move outward, except as resisted by the elastic force of the spring.

The other member of the fastener is a having a convex head $b$ and a shank $b'$ by which it is adapted to be secured to the material B, to which the material A, connected with the socket member, is to be fastened.

At the base of the convex or approximately semi-spheric head $b$ of the stud is a contracted neck $b'$ forming an annular shoulder at the base of the head $b$ with which the latch portion $d'$ of the spring and the socket member engages.

When the stud is pressed into the aperture of the socket member the convex portion crowds the latch portion $d'$ of the spring outward until the entire convex head has passed the said latch portion, when by the spring action, the latch portion snaps inward at the neck of the stud as shown in Fig. 1 and engages the shoulder at the base of the convex portion of the stud.

With the stud members thus engaged, the stud and surrounding portion of the apertured socket serve to resist strain in any direction in the plane of the fabric and the latch $d'$ also engages with the shoulder in the stud so as positively to prevent disengagement by a direct pull outward in the direction at right angles to the plane of the fabric.

It also positively prevents tilting movement of either fastener member relative to the other in any direction except a tilting movement outward in the direction of the arrows 2, 3, Fig. 1, and it yieldingly resists outward movement in that direction. There is thus no liability of the parts becoming unfastened in the conditions incident to use.

When, however, it is desired to disengage the fastening to unfasten the members, a forcible outward pressure or pull on the portion B away from the portion A on the side opposite to that where the stud is engaged by the latch portion $d'$, will cause the stud member to turn in the direction of the arrow 2 about the latch portion $d'$ as a center or axis, and it will bring the shoulder to an inclined position in which it will act with a wedging action to crowd the latch $d'$ outward so as finally to disengage the head portion of the stud and permit its removal from the socket.

If the stud member were fixed the socket member would be correspondingly disengaged by an outward pull on the side away from the latch portion $d'$ causing the socket member to turn about the said latch portion in the direction of the arrow 3 of Fig. 1 until the disengagement was effective.

To secure the desired results the socket member should be applied to the material in such position that the strain or pull of the material when fastened should be toward the side at which the latch portion $d'$ is located or in the direction of the arrow 4 of Fig. 1 and the proper application is facilitated by having the aperture eccentrically located as shown.

The socket member is shown as attached to the fabric by the prongs $a^4$ which are passed through the fabric and through apertures in a washer E and are bent down and clenched to engage the said washer as shown in Figs. 1 and 2.

By reason of the construction in which the spring has its abutment adjacent to the central aperture, it will be seen that there is a relatively long portion subjected to the spring action, which is distributed throughout the entire length of the spring from the portion $d^4$ in engagement with the abutment to the latch portion $d'$ in engagement with the stop projections $a^7$, and in the action of springing the latch portion $d'$ outward from the aperture to permit the passage of the stud head through the aperture the main body portion of the spring is drawn away from the outer wall of the spring chamber instead of being pressed toward it, this construction and arrangement of the spring and its abutments being an important feature of the fastener.

What I claim is:

A stud and socket fastener comprising a stud member having a convex head and an annular shoulder at the base thereof; and a socket member composed of a top plate having an integral flange forming a side wall, and a bottom plate secured within said flange, said top and bottom plates being apertured and provided with a spring abutment and stops adjacent to said aperture; combined with a spring contained in the chamber between said top and bottom plates, and having a latch portion extending across the aperture and engaging the stops—and a spring portion extending around the marginal part of the spring chamber, and an abutment engaging portion engaging the abutment adjacent to the aperture, the latch portion of the spring coöperating with the stud member to afford a positive lock therefor against direct withdrawal but serving as a fulcrum upon which the stud may be rocked to an inclined position to effect the release and withdrawal thereof from the socket member.

In testimony whereof, I have hereunto affixed my signature in presence of two witnesses.

GEORGE A. McCORMACK

Witnesses:
 G. A. HOLMES,
 F. H. CHASE.